Aug. 16, 1932.  H. D. CHURCH  1,872,027
FRICTION CLUTCH
Filed Oct. 14, 1925
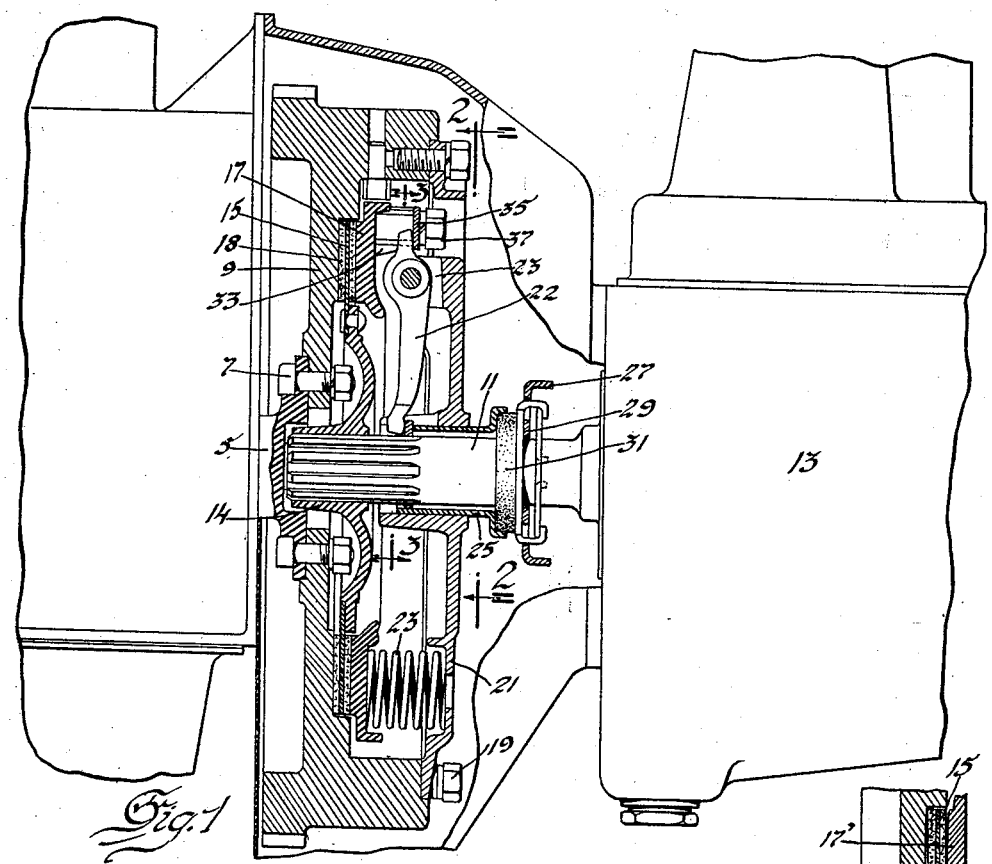
Fig.1
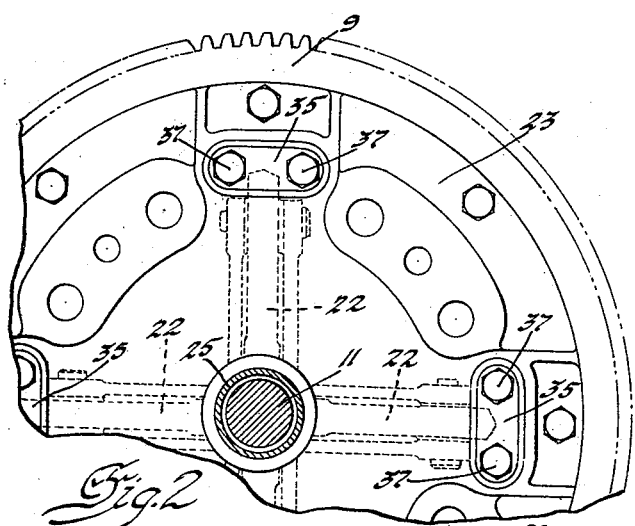
Fig.2
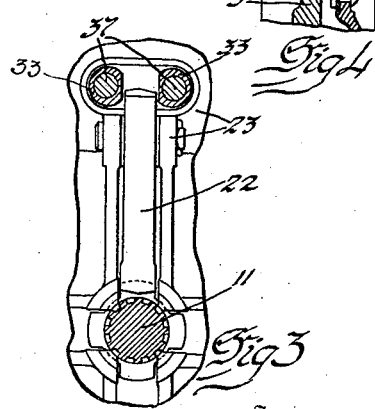
Fig.4
Fig.3
Inventor
Harold D. Church
By Blackmore, Spencer & Hule
Attorney Patented Aug. 16, 1932

1,872,027

UNITED STATES PATENT OFFICE

HAROLD D. CHURCH, OF CLEVELAND, OHIO, ASSIGNOR TO GENERAL MOTORS CORPORATION, OF DETROIT, MICHIGAN, A CORPORATION OF DELAWARE

FRICTION CLUTCH

Application filed October 14, 1925. Serial No. 62,443.

This invention relates to friction clutches, particularly intended for use in motor vehicles, and among other things involves an improved arrangement of frictional contact surfaces on the driving and driven members, whereby slippage between parts is reduced and a more positive engagement of the members is insured.

With this and other objects in view the invention is embodied in certain structural parts and combinations herein described, and specifically set forth in the appended claims.

In the drawing, Figure 1 is a view in side elevation partly in section of a clutch assembly.

Figure 2 is a rear elevation.

Figure 3 is a section on line 3—3 of Figure 1.

Figure 4, shows a sectional detail illustrating the relation of friction driving surfaces embodying the present invention.

Referring to the drawing and in particular to Figures 1, 2 and 3, reference numeral 5 represents the rear end of the crank shaft of the internal combustion engine. This shaft is secured by bolts 7 to fly wheel 9. Axially aligned with crank shaft 5, is driven shaft 11, entering the transmission housing 13. The releasable connection between the crankshaft and driven shaft shown herein forms the subject matter of divisional application, Serial No. 171,199 filed February 26, 1927, which application has matured into Patent No. 1,746,213, granted Feb. 4, 1930.

Slidably splined to the driven shaft is a member 14, carrying an annular clutch plate 15. A pressure ring 17 is located to the rear of the clutch plate and friction discs 18 are positioned on either side of the clutch plate between it and the fly wheel and pressure ring respectively.

Bolted as at 19 to the fly wheel is a rear cover plate 21. A plurality of coiled springs 23 bear at one end against the cover plate and at their other ends against the pressure plate to normally hold the clutch elements in driving relation as will be understood.

A plurality of radially extending levers 22, are pivoted to the cover plate as at 23. These levers are engaged at their inner ends by the end of a collar 25 which is slidable on the driven shaft. This collar may be otherwise moved, but is preferably actuated by an operating lever 27, the end only of which is shown on Figure 1. To this lever is secured a ring 29, and between the ring and the collar is shown a thrust member 31 of self-lubricating material such as a solid block composed of graphite embedded in a suitable binder and preferably saturated with lubricant.

The outer ends of the levers engage the pressure ring by an arrangement with which said divisional application Serial No. 171,199 is particularly concerned. Pairs of apertured bosses 33 project rearwardly from the pressure plate and overlying the surfaces of these bosses are plates 35 secured to the bosses by bolts 37. The plates 35 are preferably of steel and afford a bearing for the outer ends of the levers 22 between the bosses.

The feature of this construction whereby the bosses and steel plate are made use of has several distinct advantages. If openings were made in parts integral with the pressure plate, it would be difficult to correctly position the walls of the several openings to be engaged by the levers. The wearing surfaces would obviously be restricted to the material of the plate, whereas by the use of the apertured bosses steel bearing surfaces are available. Wear is easily corrected by replacing a plate. Furthermore, as compared with the difficulty of manufacture involved in the provision of openings made in an integral structure the present arrangement is very simple. By the same operation in which other parts of the pressure plate are being surfaced, the faces of the bosses are also finished.

The relation of the frictionally engaging members of the clutch is preferably in accordance with that shown in Figure 4. In this figure 9′ represents the fly wheel element of the clutch, 15 is the clutch plate and 17′ is the pressure plate. Differing from the form shown in Figure 1, it will be observed that the fly wheel face and the face of the pressure plate are inclined to the vertical and that between them is a flat face clutch disc. Upon the parts being forced into engagement, the face of the driven clutch member 15 will be distorted into a conoidal form, its resiliency insuring a gradual and smooth clutch action.

What I claim and desire to protect by Letters Patent is:

1. A clutch having a fly wheel member with an annular friction face inclined to the vertical and a pressure member with a similarly inclined friction face, a driven member in the form of a flat disc between the aforesaid inclined surfaces, arranged to have this disc conform to the aforesaid inclined surfaces upon pressure of the pressure member toward the fly wheel member.

2. A clutch, comprising a driving ring shaped member, a pressure member of ring shape, a ring shaped member between them functioning as a driven member, the driven ring being in the form of a flat disc and the adjacent surfaces of the driving ring shaped member and the pressure member being inclined to the plane of the driven member.

3. In a clutch structure for connecting together two shafts, the combination of a flat clutch plate on one of the shafts, said clutch plate having friction surfaces which lie normally in parallel planes perpendicular to the axis of the shaft, and parts on the other shaft having friction surfaces between which said plate is clamped, said friction surfaces being complementary to each other and non-parallel to the plane of the clutch plate.

4. In a clutch structure for connecting together two shafts, the combination of a flat clutch plate on one of the shafts, said clutch plate having friction surfaces which lie normally in parallel planes perpendicular to the axis of the shaft, and parts on the other shaft having friction surfaces between which said plate is clamped, said friction surfaces being spaced apart equally at all points and having a shape such that they are not parallel to the plane of the clutch plate.

5. In a clutch structure for connecting together two shafts, the combination of a flat clutch plate on one of the shafts, said clutch plate having friction surfaces which lie normally in parallel planes perpendicular to the axis of the shaft, and parts on the other shaft having friction surfaces between which said plate is clamped, said friction surfaces being parallel to each other and extending at an angle to the plane of the clutch plate when the clutch is in "out" position.

6. In a clutch structure, the combination with a driving shaft and a driven shaft, of a fly wheel having a friction surface thereon, a clutch ring having a complementary friction surface, said flywheel and clutch ring being carried by one of said shafts, and a clutch plate carried by the other shaft, the peripheral portion of said clutch plate being located between said friction surfaces, said peripheral portion having friction surfaces which lie in planes at right angles to its shaft, and said friction surfaces on the fly wheel and the clutch ring being complementary and so shaped that they are not parallel to the friction surfaces on the clutch plate.

7. The combination with a driving shaft and a driven shaft, of a clutch structure for connecting them, said structure comprising parts on one shaft having friction surfaces which are parallel to each other but lie in planes at an angle other than a right angle to the shaft, and a clutch plate on the other shaft, the peripheral portion of the clutch plate being between said friction surfaces, such peripheral portion having friction surfaces which lie in parallel planes at a right angle to its shaft.

8. In a friction clutch, the combination of a relatively fixed clutch member, a relatively movable clutch member, and a driven plate member located therebetween, and friction rings upon opposite faces of said plate member, the contact area between the clutch members and rings constructed to progressively increase till full contact and engagement of the clutch is effected by the kinking of said plate under pressure between said clutch members.

In testimony whereof I affix my signature.

HAROLD D. CHURCH.